Dec. 4, 1962 W. H. FLANAGAN, JR 3,066,643
ELECTRICAL DEVICE
Filed May 2, 1960
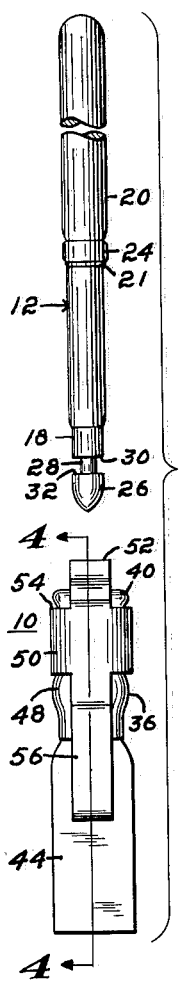
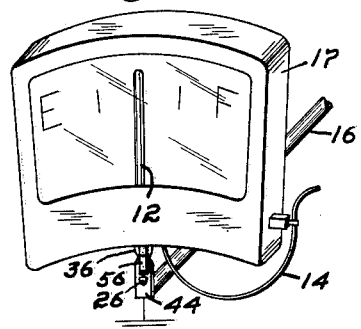
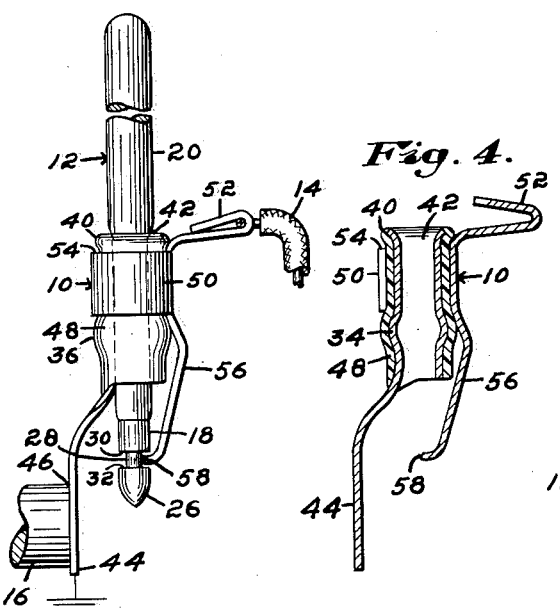
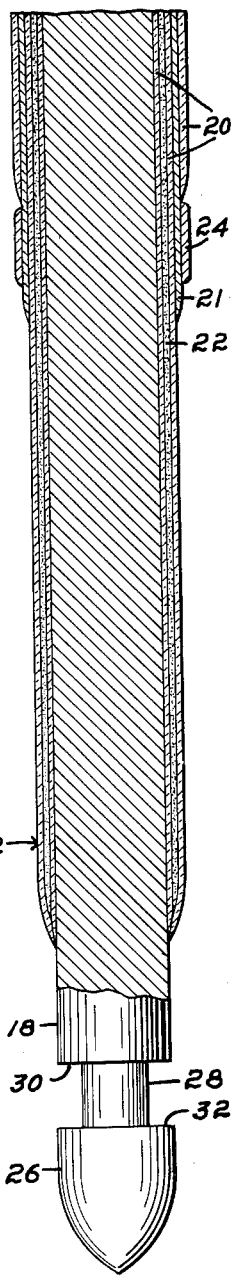
Inventor:
William H. Flanagan Jr.,
by James B. Tiffany Jr.
Atty.

United States Patent Office 3,066,643
Patented Dec. 4, 1962

3,066,643
ELECTRICAL DEVICE
William H. Flanagan, Jr., Wellesley, Mass., assignor to United-Carr Fastener Corporation, Cambridge, Mass., a corporation of Delaware
Filed May 2, 1960, Ser. No. 26,174
2 Claims. (Cl. 116—136.5)

This invention relates generally to an electrical device, particularly to a conductive socket member for use in gauges or indicators utilizing the electroluminescent principle.

Heretofore, primarily in the automotive industry, fuel and ammeter gauges along with other engine operating condition indicators have been illuminated by means of lamp bulbs mounted directly behind the panel with either slotted or opaque openings cut therethrough to diffuse the light. With the development of the electroluminescent principle of lighting, it is now possible to illuminate the pointed and/or the meter face directly by applying an alternating potential. Consequently, a need has developed for new means of connecting the electrical source to a freely movable electroluminescent pointer.

The object of this invention is to provide a socket member for use with a moveable electroluminescent indicator pointer.

Another object of this invention is to provide a socket member for mounting on a rotatable shaft to direct an electrical energy through a luminescent pointer.

A further object of this invention is to provide an electrical member for use as an indicator socket which can be simply and economically constructed.

Other objects of the invention will, in part, be obvious, and will, in part, appear hereinafter.

In the drawings:

FIG. 1 is a view in front elevation of a luminescent pointer superposed over the socket member;

FIG. 2 is a view in front elevation of a fuel indicator gauge with the pointer and socket in assembly;

FIG. 3 is a view in side elevation of the pointer assembled with the socket showing the electrical connection;

FIG. 4 is a view in section taken on line 4—4 of FIG. 1; and

FIG. 5 is an enlarged view of the pointer, partly in section.

Referring to the drawings, there is illustrated an electrical socket 10 for use with a pointer 12 having an electrical lead 14 coming from the power supply and a shaft member 16 attached to the pointer, the entire assembly adapted for use with a gauge or indicator 17.

The pointer as illustrated in FIG. 5 comprises a steel core 18 having consecutive layers of a poor dielectric, such as a ceramic 20, conducting layers of phosphor 21 and an outer coating of thin transparent tin oxide 22. A final layer of ceramic 20 covers the device to prevent accidental shorting due to the movement of the pointer through extremes of its travel contacting the gauge. A silver patch 24 is placed on the pointer to make contact with the interior of the shell. The principle of electroluminescent lighting is well known in the art and comprises the application of an alternating circuit to the core and due to the construction of the pointer allowing the potential to leak off through the various coatings to ground will cause the phosphorous layers to glow. The steel core 18 of the pointer 12 has a tapered nose portion 26 to facilitate insertion within the socket member 10 and may, as illustrated in FIG. 5, be provided with a reduced cross section 28 defining shoulders 30 and 32 for a purpose to be disclosed hereafter.

The socket 10 includes a rolled tubular shell 34 having an outwardly formed annular detent 36 formed adjacent the lower end 38 and a flared top edge 40 surrounding the opening 42. An attaching leg 44 extends downwardly from the outer surface of the shell 34 but spaced in parallel relationship to a continuation of the axis of the shell 34 and may be secured at the terminal end 46 of the shaft 16 by welding or other means. An insulating coating 48 completely encompasses the tubular shell as illustrated in FIGS. 3 and 4, and one of the materials proven to be most effective is an acrylic plastic although any material having a high dielectric quality can be effectively used. Completing the socket assembly is a contact member including a rolled tubular band 50 which lies annularly disposed around the insulated shell between the detent 36 and the flared top edge 40 having a clip member 52 extending outwardly from the top edge 54. As illustrated in FIG. 3, an integral arm 56 extends outwardly and then curves inwardly in the direction of the axis of the shell 34 and terminates in a line coinciding with the central axis of the shell 34 for a purpose to be described hereafter.

The electrical connections and circuit path are arranged so that the power supply lead 14 may be attached to the clip member by any suitable means, such as soldering or staking, and the distal end 58 of the arm 56 enters into frictional engagement with the reduced cross-section 28 of the core 18, with the shoulders 30 and 32 preventing accidental axial withdrawal. The current passes through the core 18 and by leakage through the various layers of phosphor, dielectric, to the transparent tin is conducted to ground through the shaft member 16.

It will readily be seen that this type of a socket provides a simple means of establishing and maintaining electrical continuity through an electroluminescent article of the character described.

Since certain other obvious modifications may be made in this device without departing from the scope of the invention, it is intended that all matter contained herein be interpreted in an illustrative and not in a limiting sense.

I claim:

1. An instrument assembly comprising in combination an electroluminescent pointer and a socket to frictionally receive said pointer and effect an electrical connection to an external source, said socket comprising a tubular shell having a flared mouth and an annular flange adjacent the other end, a conductor member disposed between the ends of said shell and insulated therefrom, an arm extending outwardly and downwardly from said shell for attachment to an actuating shaft, and contacts extending from said conductor member maintaining continuity between an external power supply and the core of said pointer.

2. An electrical assembly including in combination a multilayered electroluminescent pointer and a socket member providing electrical connections to an external source, said pointer having an outer conductor separated from an inner conductor by alternate dielectric and luminous layers, said socket comprising a hollow tubular shell having an arm extending obliquely downward from one end thereof for attachment to a rotatable shaft, a metallic band encircling said shell and insulated therefrom and disposed between the distal ends, said band having a clip portion extending outwardly for cooperate engagement with a power supply and a downwardly extending leg inclined so as to terminate along a line defining a continuation of the central axis of said shell whereby said leg enters into abutting engagement with the inner conductor of said pointer.

References Cited in the file of this patent

UNITED STATES PATENTS

| | | |
|---|---|---|
| 2,414,143 | Dunning | Jan. 14, 1947 |
| 2,736,872 | Heath et al. | Feb. 28, 1956 |
| 2,738,484 | Beckman et al. | Mar. 13, 1956 |
| 2,807,792 | O'Keefe et al. | Sept. 24, 1957 |

FOREIGN PATENTS

| | | |
|---|---|---|
| 531,947 | Great Britain | Jan. 14, 1941 |
| 997,918 | France | Sept. 19, 1951 |